Figure 1:
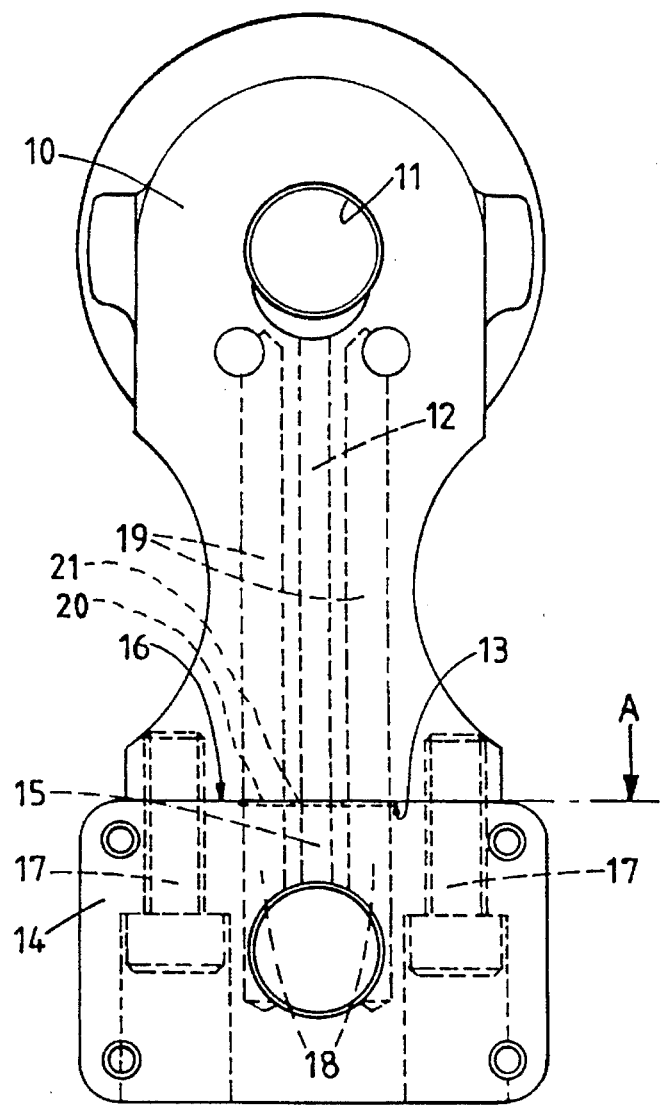

US005485823A

United States Patent [19]
Lintott et al.

[11] Patent Number: 5,485,823
[45] Date of Patent: Jan. 23, 1996

[54] FUEL PUMP HAVING A LEAKED FUEL CONVEYING STRUCTURE

[75] Inventors: Edward R. Lintott, London; Colin T. Timms, Middlesex, both of England

[73] Assignee: Lucas Industries public limited company, West Midlands, England

[21] Appl. No.: 343,355

[22] Filed: Nov. 22, 1994

Related U.S. Application Data

[63] Continuation of Ser. No. 70,375, filed as PCT/GB91/02026, Nov. 18, 1991, abandoned.

[30] Foreign Application Priority Data

Dec. 11, 1990 [GB] United Kingdom ............... 9026840

[51] Int. Cl.⁶ ................................................. F02M 59/44
[52] U.S. Cl. ............................................................ 123/506
[58] Field of Search ............................. 417/490; 123/506

[56] References Cited

U.S. PATENT DOCUMENTS

| | | |
|---|---|---|
| 4,669,659 | 6/1987 | Leblanc et al. |
| 4,793,314 | 12/1988 | Yoshinaga et al. .................... 123/506 |
| 5,070,848 | 12/1991 | Mitsuyasu .............................. 123/506 |

FOREIGN PATENT DOCUMENTS

| | | |
|---|---|---|
| 0178428 | 4/1986 | European Pat. Off. |
| 0372712 | 6/1990 | European Pat. Off. |
| 1146303 | 11/1957 | France . |
| 2311924 | 11/1974 | Germany . |
| 3700358 | 1/1987 | Germany . |
| 958345 | 5/1964 | United Kingdom . |

OTHER PUBLICATIONS

*The Engineer*, Nov. 15, 1957, pp. 703–704 (best copy available) International Search Report, International Publication Date: Jun. 25, 1992, International Publication No. WO92/10669.

*Primary Examiner*—Richard E. Gluck
*Attorney, Agent, or Firm*—Trexler, Bushnell, Giangiorgi & Blackstone, Ltd.

[57] ABSTRACT

A fluid connection between a pair of passages (12,15) which open onto surfaces (13,16) in respective body parts which are secured together. About one of the passages a sealing zone (21) is established in a respective surface and the zone is surrounded by a depression (20) which communicates with a drain passage.

2 Claims, 2 Drawing Sheets

5,485,823

FUEL PUMP HAVING A LEAKED FUEL CONVEYING STRUCTURE

This application is a continuation of application Ser. No. 08/070,375, filed as PCT/GB91/02026, Nov. 18, 1991, now abandoned.

This invention relates to a method of and apparatus for achieving a connection between a pair of passages which in use contain liquid at high pressure, and which are formed in respective body parts adapted to be secured together.

An example of such a connection exists in a so called unit injector for supplying fuel to an engine. The injector comprises a main body in which is housed an engine cam actuated pump having an outlet connected to a fuel injection nozzle carried by the main body. The injector also includes an electromagnetically operated spill valve through which fuel delivered by the pump can be spilled. The spill valve can be located in the main body but it is preferred to mount it in a separate body which is secured to the main body. In this way a single design of spill valve can be provided for different forms of the pump. The spill valve is connected to the pump by a spill passage which when the spill valve is closed contains fuel at very high pressure. If the spill valve is to be mounted in a separate body a connection has to be effected between the two parts of the spill passage and it is necessary to ensure that so far as is possible there is no leakage of fuel from the passages. The injector is mounted within a cover of the associated engine and if there is leakage the fuel must be contained since otherwise it could contaminate the lubricating oil of the engine.

The object of the invention is to provide a method and apparatus for the purpose specified.

According to the invention a method of and apparatus for achieving a connection between a pair of passages formed in respective body parts, comprises machining the body parts to form sealing surfaces respectively onto which the respective passages open, machining in one of said surfaces a depression about a sealing zone surrounding the passage opening onto said surface, providing a drain passage from said depression and securing the body parts together so that said sealing zone engages with the other sealing surface about the passage therein.

Figure 2:
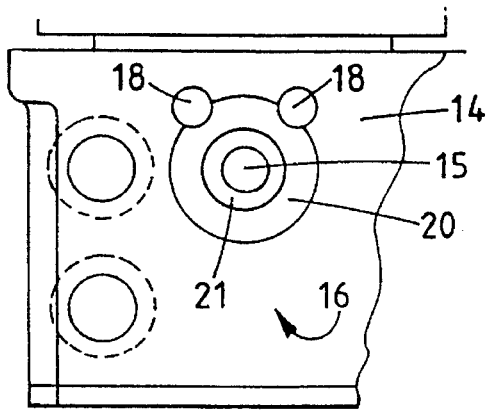
Figures 3, 4:
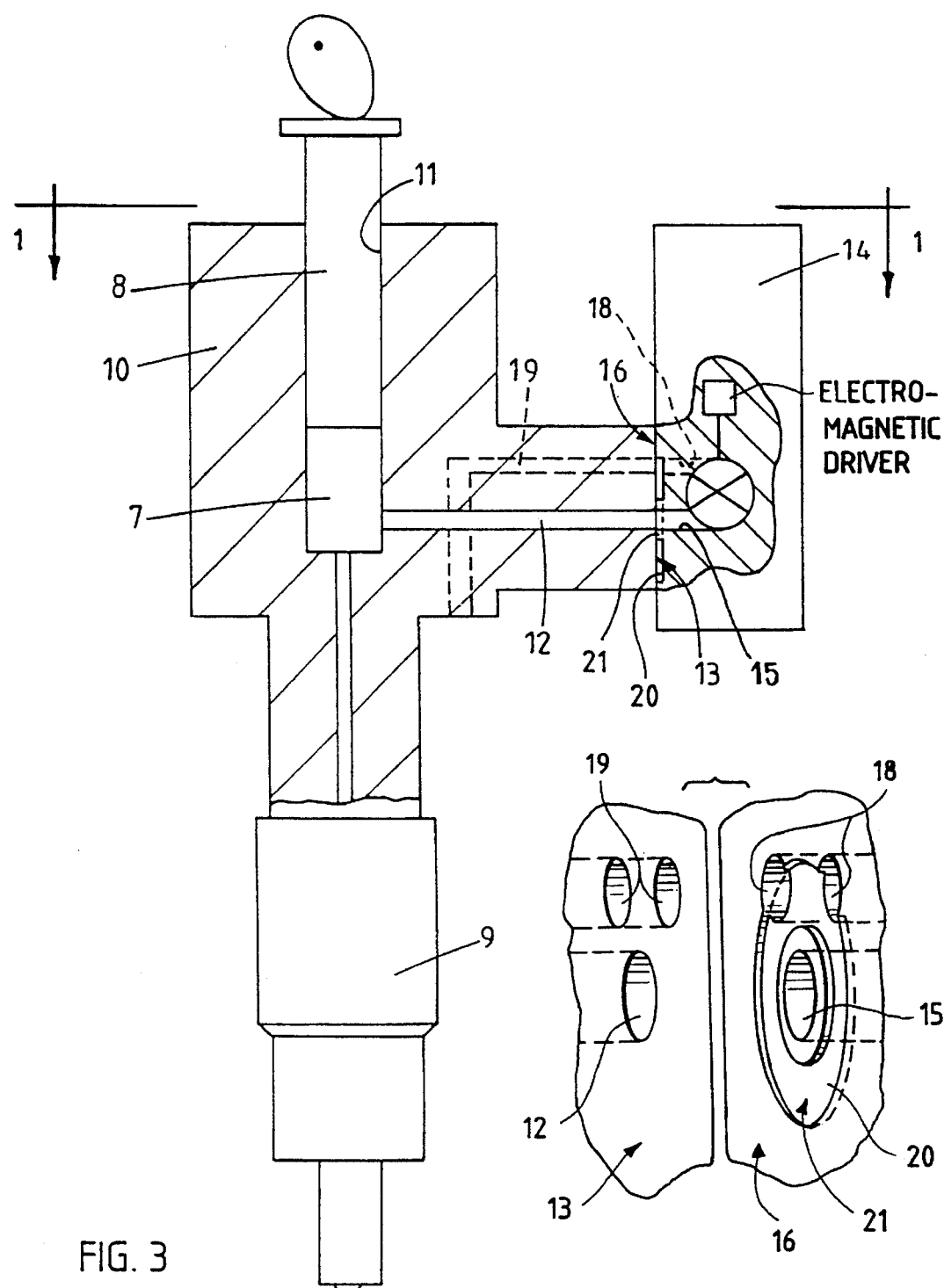

An example of a method and apparatus in accordance with the invention will now be described with reference to the accompanying drawings in which:

FIG. 1 is a plan view of part of a unit injector; and
FIG. 2 is a view on the arrow A of part of the injector seen in FIG. 1; and
FIG. 3 is a simplified, partial sectional, side elevational view of the unit injector as shown in FIG. 1.

Referring to the drawings a pump injector includes a body 10 in which is formed a bore 11 in which is located a cam actuated pumping plunger 8. A portion of the bore defines a pumping chamber 7 which is connected to the inlet of a fuel injection nozzle 9 mounted on the body 10 and also to a spill passage 12 which extends to a sealing face 13 machined on the body 10. Flow of fuel through the passage 12 is controlled by a spill valve which is mounted on a spill valve body 14 and in which is formed a continuation 15 of the passage 12. The spill valve body 14 is provided with a sealing face 16 and the two sealing faces are held in engagement by bolts 17 which secure the spill valve body 14 to the pump body 10. The spill valve body also defines a pair of return passages 18 through which fuel when the spill valve is opened, can flow from the passage 15 to return passages 19 formed in the pump body 10.

The spool valve is of known construction such as the spill valve 30 shown in U.S. Pat. No. 4,526,519 to Mowbray et al. filed Jul. 19, 1983 and issued Jul. 2, 1985 (hereinafter referred to as Mowbray '519). The spool valve 30 as shown in Mowbray '519 includes a valve body 37 which is screwed into an extension 38 of the housing. The body acts to retain a flange sleeve 39 against a step defined in a recess in the housing. A washer is interposed between the sleeve and the step. Opening onto this step is a port 41 connected to the pump outlet 18 and this port communicates with an enlargement in the bore in the sleeve by way of passage 42 in the sleeve. The washer 40 is provided with an aperture to permit the fuel flow and to insure the correct orientation of the washer, a dial 45 is provided which extends into a locating slot in the washer. The bore in the sleeve mounts a slidable valve member 46 having a head 47 which can be urged into contact with a seating defined by the sleeve, upon energization of an actuator 31. When the head is in contact with the seating, spillage of fuel from the pump is prevented.

The pressure of fuel contained in the passages 12 and 15 when the spill valve is closed and during inward movement of the pumping plunger is extremely high and it is necessary to minimise so far as is possible, leakage from the passages 12 and 15. This is achieved by accurately forming the sealing surfaces 13 and 16. No sealing gasket is provided.

In the event that some leakage of fuel does take place, it is necessary to ensure that the fuel does not leak to the exterior of the bodies 10 and 14 since this fuel could contaminate the lubrication system of the associated engine. The surface 16 is therefore provided with an annular depression 20 which surrounds an annular sealing zone 21 about the passage 15. It is arranged that the passages 19 open into the depression 20 and since these passages in use, will be connected to a source of fuel at a low pressure, any fuel which does leak from the passages 12 and 15 across the seal defined by the sealing zone 21 and the surface 13, will collect in the depression and flow to the drain. The normal sealing engagement between the surfaces 16 and 13 is sufficient to withstand the fuel pressure in the passages 18 and 19.

We claim:

1. A unit injector for supplying fuel to an engine comprising a main body (10) in which is formed a bore (11) which houses a cam actuated pumping plunger (8), a pumping chamber (7) defined by part of the bore, and an outlet from the pumping chamber which is connected to a fuel injection nozzle mounted on the main body (10), electromagnetically operated spill valve (14) mounted on the main body (10), a spill passage (12) formed in the main body (10) communicating with said pumping chamber (7) under high pressure produced by said pumping plunger and with a connecting passage (15) formed in the spill valve (14), said main body (10) and said spill valve (14) defining surfaces (13,16) which are secured together, a low pressure drain passage (18,19) extending between said main body and said spill valve for transporting fluid leaked from said passages (12,15) at said surfaces (13,16), a fluid collection structure (21) being disposed on one of said surfaces (13,16) surrounding the respective passage (12,15) opening thereon, said fluid collection structure engaging the other surface about the passage opening thereon, said fluid collection structure comprising:

an annular depression (20) formed in said one surface, said annular depression being defined by an inner perimeter which is spaced away from said passages (12,15);

a rim being defined between said annular depression and said passages;

a face of said rim abutting the other of said surfaces (13,16) generally preventing fluid from escaping from said passages (12,15) at the interface of said surfaces (13,16); and said drain passage (18,19) communicating with said depression for draining fuel which is forced under high pressure between said face of said rim and said other surface into said depression and preventing the leaked fuel from leaking to the exterior of said main body (10) and said spill valve (14).

2. A unit injector according to claim 1, characterised in that said drain passage (19) receives fuel from said spill passage (12) under the control of said electromagnetically operable valve.

* * * * *